(12) United States Patent
Kaneko

(10) Patent No.: US 6,581,630 B1
(45) Date of Patent: Jun. 24, 2003

(54) PRESSURE CONTROL VALVE

(75) Inventor: Tsutomu Kaneko, Takasaki (JP)

(73) Assignee: Furukawa Co., Ltd., Tokyo (JP)

(*) Notice: Subject to any disclaimer, the term of this patent is extended or adjusted under 35 U.S.C. 154(b) by 0 days.

(21) Appl. No.: 09/869,624

(22) PCT Filed: Dec. 27, 1999

(86) PCT No.: PCT/JP99/07355

§ 371 (c)(1), (2), (4) Date: Jun. 28, 2001

(87) PCT Pub. No.: WO00/39490

PCT Pub. Date: Jul. 6, 2000

(30) Foreign Application Priority Data

Dec. 28, 1998 (JP) .......................................... 10-373006
Jul. 16, 1999 (JP) .......................................... 11-203403

(51) Int. Cl.$^7$ .............................................. F16K 17/06
(52) U.S. Cl. ................... 137/492.5; 137/109; 137/529
(58) Field of Search .................. 137/109, 492.5, 137/491, 529; 251/82, 83

(56) References Cited

U.S. PATENT DOCUMENTS 3,212,523 A * 10/1965 Martin ....................... 137/491

FOREIGN PATENT DOCUMENTS

| JP | 57158 579 U | 10/1982 |
| JP | 63095510 A | 4/1988 |
| JP | 02266405 A | 10/1990 |
| JP | 4-30 369 U | 3/1992 |
| JP | 05306782 A | 11/1993 |
| JP | 07248067 A | 9/1995 |

* cited by examiner

*Primary Examiner*—John Rivell
(74) *Attorney, Agent, or Firm*—Young & Basile, P.C.

(57) ABSTRACT

A pressure control valve automatically controllable of a set value of a pressure circuit by pilot operation without using an electrical signal, is provided. A pressure control valve include a valve body (30) opposing to a seat surface of a relief port (A) connected to a pressure circuit (46) and a spring (32) biasing the valve body (30) onto the seat surface, for flowing out a part of the fluid within the pressure circuit (46) to hold the fluid pressure in the pressure circuit (46) at a predetermined set pressure when the fluid pressure in the pressure circuit (46) is higher than or equal to the set pressure. A pilot piston (40) is arranged movably in expansion and contraction direction of the spring (32) at an end portion of the spring (32) remote from the valve body (30), the pilot piston (40) moves in a direction for compressing the spring (32) when a predetermined pressure of a pilot fluid is input. A spring force of the spring (32) is increased and decreased by varying compression force of the spring (32) by moving the pilot piston (40) depending upon increasing and decreasing of the pressure of the pilot fluid.

4 Claims, 16 Drawing Sheets

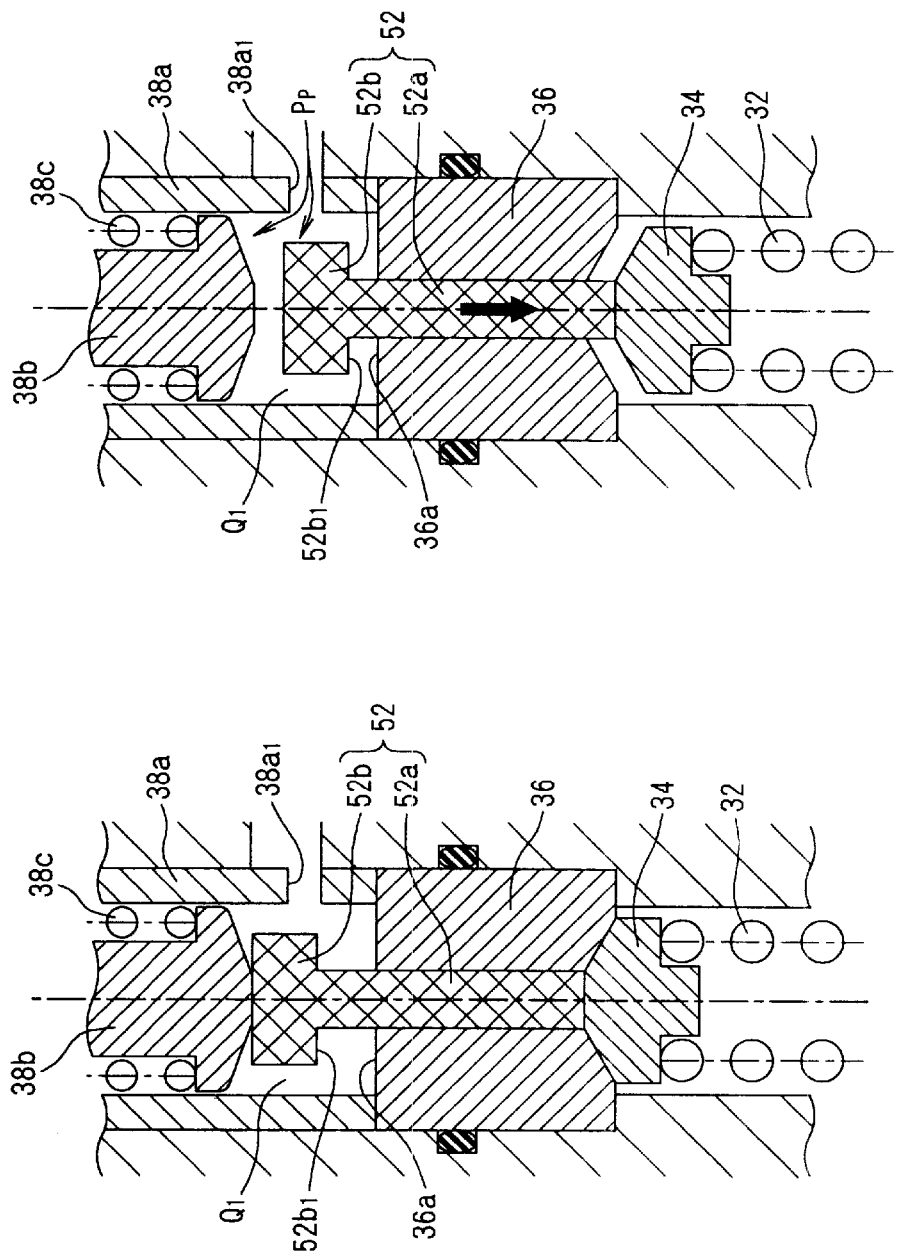

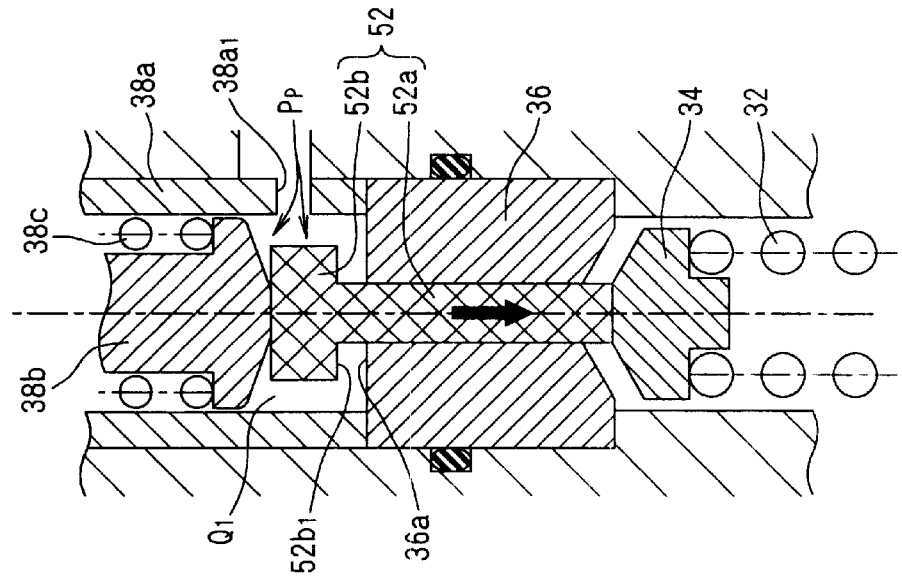
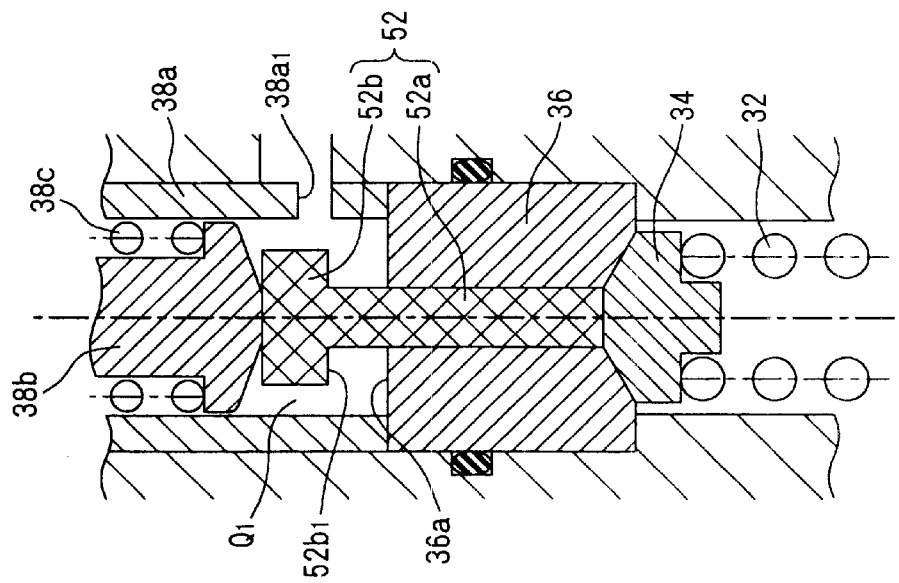

PRESSURE CONTROL VALVE

TECHNICAL FIELD

The present invention relates to a pressure control valve for holding the inside of a pressure circuit at a predetermined set pressure.

BACKGROUND ART

A pressure control valve for holding the inside of a pressure circuit at a predetermined set pressure, such as a direct acting relief valve 2 shown in FIG. 21 has been known, for example.

The direct acting type relief valve 2 closes a relief port 3 in communication with a pressure circuit by a poppet valve 6 biased by a pressure adjusting spring 4. When a pressure in the pressure circuit becomes higher than or equal to a predetermined set pressure, the poppet valve 6 is lifted up to communicate the relief port 3 with a drain port 5 so that a part of a fluid in the pressure circuit may flows out through the drain port 5. Therefore, the pressure circuit can be held at the predetermined set pressure. It should be noted that adjustment of the set pressure is performed by varying a biasing force of the spring 4 by turning an adjusting screw 8.

Here, in the direct acting type relief valve 2, the pressure adjusting spring 4 also serves for urging of the poppet valve 6. Therefore, the spring 4 has to be strengthened for use in a pressure circuit of high pressure. However, for this, the valve per se becomes large to limit the strengthening of the spring 4. Therefore, normally, in the circuit of high pressure, a pilot action type relief valve has been used.

As shown in FIG. 22, a pilot actuation type relief valve 10 has such a construction that a relief port 3 is communicated with an upper chamber 14a of a main valve and a direct acting relief valve 18 forming a pilot portion via an orifice 12. When pressure higher than or equal to a predetermined set pressure develops in the pressure circuit, the poppet valve 18a overcomes the biasing force of the spring 18b to move downwardly to open the direct acting relief valve 18. By this, the upper chamber 14a and the drain port 5 are communicated to lower the pressure to open the main valve 14 to flow out the fluid in the pressure circuit toward the drain port 5. The pressure circuit at high pressure can be maintained at the predetermined set pressure.

SUMMARY OF THE INVENTION

A pilot portion, in place of the direct acting relief valve 18 of the pilot actuation type relieve valve 10 shown in FIG. 22, including a proportional electromagnetic type pressure control portion for controlling pressure of an upper chamber, such as chamber 14a, by inputting of an electrical pilot signal is provided. The pressure circuit can be controlled automatically at a predetermined range of set pressure.

However, when a proportional electromagnetic type pressure control portion is used, the pressure control valve may have complicate internal structure and a high production cost. Furthermore, since electricity is used, another problem may be encountered in safety, such as the possibility of fire.

The present invention has been worked out in view of the problems set forth above. It is an object to provide a pressure control valve which employs a pilot operation type structure with simple construction not using an electrical signal for automatically controlling a set pressure of a pressure circuit in a step-less manner.

In order to solve the above-mentioned problem, a pressure control valve defined in claim 1 includes a valve body opposing a seat surface of a relief port connected to a pressure circuit, a spring biasing the valve body onto the seat surface, for flowing out a part of fluid within the pressure circuit to hold the fluid pressure in the pressure circuit at a predetermined set pressure when the fluid pressure in the pressure circuit is higher than or equal to the set pressure, a pilot piston is arranged movably in expansion and contraction direction of the spring at an end portion of the spring remote from the valve body, the pilot piston moves in a direction for compressing the spring when a predetermined pressure of a pilot fluid is input, and a spring force of the spring is increased and decreased by varying compression force of the spring by moving the pilot piston depending upon increasing and decreasing of the pressure of the pilot fluid, and a spring initial valve adjusting means which comprises an initial valve adjusting spring for modifying an initial spring force of the spring by varying the pilot piston to a position proximal to the valve body and a position remote from the valve body when the pilot fluid is not input.

By the pressure control valve defined in claim 1, when the pilot fluid does not flow in, the spring urges the valve body onto the seat surface with a predetermined spring force, a pressure in the pressure circuit is maintained at a predetermined set pressure. When the pressure in the pressure circuit becomes higher than or equal to the set pressure, the valve body is opened against the spring force of the spring to flow the fluid of the pressure circuit to the relief port and flow externally to lower pressure than the pressure in the pressure circuit. When the pressure in the pressure circuit becomes the set pressure, the valve body can abut the seat surface of the relief port by the spring force of the spring to maintain the pressure in the pressure circuit at the set pressure.

On the other hand, when the pilot fluid flows into the valve body, the pilot fluid compresses the spring by moving the pilot piston toward the valve body side and can increase the spring force by shortening the spring length to modify the pressure control valve with an increased set pressure. Thus, the pressure control valve of the present invention can freely modify the set pressure, and the fluid pressure in the pressure circuit can be automatically controlled in step-less manner.

Since fluid is used as the pilot signal, in comparison with the conventional proportioning electromagnetic type pressure control valve using the electrical pilot signal, the pressure control valve of the present invention provides satisfactory measure in view of safety, such as fire prevention or the like and lowers production cost with simple structure.

By operation of the spring initial valve adjusting means, the initial spring force of the spring is varied to enable modification of the set pressure within the wide range.

The present invention defined in claim 2, in the pressure control valve as set forth in claim 1, further comprises a spring force upper limit setting means for holding a large spring force of the spring constant by restricting movement of the pilot piston toward the valve body when a pressure of the pilot fluid is elevated up to a predetermined high value.

By the pressure control valve defined in claim 2, when the pressure of the pilot fluid is elevated to high value, a constant large spring force of the spring becomes a force for biasing the valve body onto the seat surface to have the pressure control valve with the upper limit of the set pressure.

The present invention defined in claims 3, in the pressure control valve as set forth in claim 1 or 2, comprises the spring being set with a spring force resisting against a force for moving the pilot piston toward valve body side until the pressure of the pilot fluid is elevated to a predetermined value.

By the pressure control valve defined in claim 3, until the pressure of the pilot fluid is elevated up to the predetermined value, a constant small spring force of the spring becomes a force biasing the valve body onto the seat surface to provide the pressure control valve with the lower limit of the set pressure.

Furthermore, the invention defined in claim 4, in the pressure control valve as set forth in claim 1 or 2, further comprises spring initial valve adjusting means for modifying an initial spring force of the spring by varying the pilot piston to a position proximal to the valve body and a position remote from the valve body when the pilot fluid is not input.

The pressure control valve as set forth in claim 3, further comprises spring initial valve adjusting means for modifying an initial spring force of the spring by varying the pilot piston to a position proximal to the valve body and a position remote from the valve body when the pilot fluid is not input.

By the pressure control valve defined in claim 4, by operation of the spring initial value adjusting means, the initial spring force of the spring is varied to enable modification of the set pressure within a wide range.

It should be noted that the pressure control valve defined in claim 6, a valve body opposing a seat surface of a relief port connected to a pressure circuit and a spring biasing the valve body onto the seat surface. When a fluid pressure in the pressure circuit is higher than or equal to a set pressure, fluid flows out for holding a predetermined set pressure within the pressure circuit. The invention further comprises a bias spring biasing the valve body for opening and closing the relief port to closing side, a pilot piston for biasing the biasing spring to closing side by a pressure of a pilot fluid, an initial valve adjusting spring for biasing the pilot piston to closing side, and a return spring for biasing the valve body or pilot piston to opening side.

The pressure control valve automatically controls the working fluid pressure of the hydraulic circuit by varying the relief pressure in step-less manner by inputting the pilot pressure to the pilot port. Within a range where the pilot pressure input is lower than or equal to the predetermined pressure, the control pressure can be maintained constant. Initial pressure can also be adjusted.

BRIEF DESCRIPTION OF THE DRAWINGS

FIG. 7($a$) is an illustration showing a first arrangement example of a pilot piston forming the second embodiment of the pressure control valve;

FIG. 7($b$) is an illustration showing the pressure control valve in which the pilot piston moves downwardly apart from the piston position setting member;

FIG. 8($a$) is an illustration showing a second arrangement example of a pilot piston forming the second embodiment of the pressure control valve;

FIG. 8($b$) is an illustration showing a second arrangement example of a pilot piston forming the second embodiment of the pressure control valve with pilot pressure communicating with a piston bore and a member directing the piston downward;

FIG. 9($b$) is an illustration showing a third arrangement example of a pilot piston forming the second embodiment of the pressure control valve with pilot pressure communicating with a piston bore and a member directing the piston downward;

FIG. 11($b$) is a second explanatory illustration showing actuation of the third embodiment of the pressure control valve;

FIG. 11($c$) is a third explanatory illustration showing actuation of the third embodiment of the pressure control valve;

FIG. 17($b$) is a second explanatory illustration showing actuation of the roof cleaning device;

FIG. 17($c$) is a second explanatory illustration showing actuation of the roof cleaning device;

BEST MODE FOR CARRYING OUT THE INVENTION

Embodiments of the present invention will be discussed hereinafter with reference to the drawings.

Figure 1:
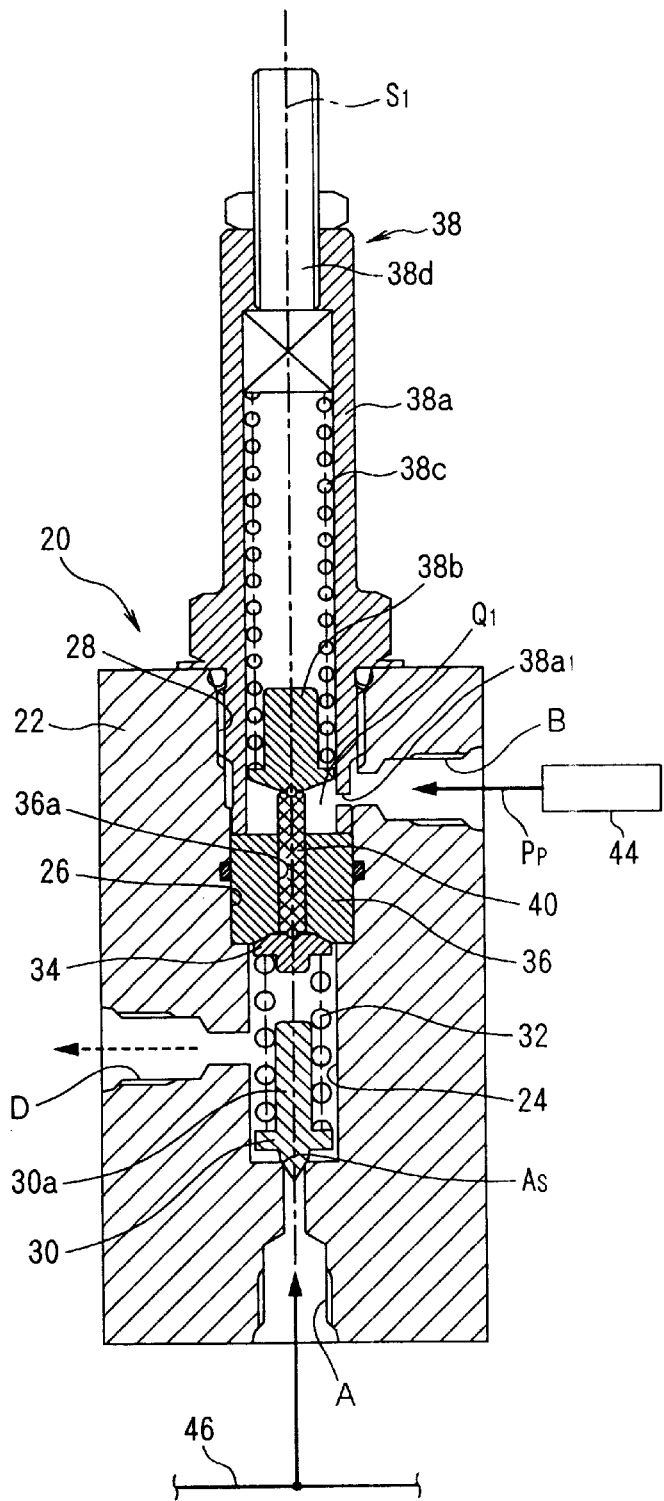
FIG. 1 is an illustration showing the first embodiment of a pressure control valve according to the present invention.

FIG. 1 shows the first embodiment of a relief valve 20.

In a valve body 22 of the relief valve 20, includes a valve chamber 24 as cylindrical internal space on an axis S1, a cylinder receptacle chamber 26 has a cylindrical internal space of greater diameter and is continuous with the valve chamber 24, as is coaxially aligned on the axis S1 adjacent an upper side of the valve chamber 24, and a connection bore 28 continuous with the cylinder receptacle chamber 26 and coaxially aligned on the axis S1 adjacent an upper side of the cylinder receptacle chamber 26 and having an upper end opened.

In addition, in the valve body 22, a relief port is coaxially aligned on the axis S1 and communicates with the valve chamber 24, a drain port D opens on the inner peripheral surface of the valve chamber 24, and a pilot port B opens on the inner peripheral surface of the connection bore 28.

In addition, in the valve chamber 24, a poppet valve 30 includes cone shaped tip end portion and opposes a seat surface $A_s$ of the relief port A. A poppet valve spring 32 biases the poppet valve 30 onto the seat surface $A_s$, and a piston stroke transmitting portion 34 engages the upper end of the poppet valve spring 32 and contacts a pilot piston 40. The base end side of the poppet valve 30 is formed with a cylindrical guide portion 30a to receive the poppet valve spring 32 for guiding from inside, and opposes the lower end portion of the piston stroke transmitting member 34.

In the cylinder receptacle chamber 26, a cylinder member 36 having a piston bore 36a is fitted coaxially on the axis S1. In the piston bore 36a, the cylindrical solid pilot piston 40 having a longer length than the length of the cylindrical member 36 is slidably inserted.

On an upper portion of an inner periphery of the connection bore 28, a female thread is formed. To the female thread, a male thread formed on an outer periphery of a cylindrical body 38a, a component of an initial value adjusting portion 38, is threadingly engaged, and whereby the initial value adjusting portion 38 is connected to the valve body 22.

The initial value adjusting portion 38 is constructed with a cylindrical body 38a, a piston position setting member 38b arranged inside of the cylindrical body 38a and moving the pilot piston 40 in the direction of the axis S1, an initial value adjusting spring 38c applying a predetermined downward spring force for the pilot piston 40 when the position setting member 38b contacts the pilot piston 40 and an adjusting screw 38d threadingly engaging with the female thread provided in the upper portion of the cylindrical body 38a for varying the spring force of the initial value adjusting spring 38c.

Figure 2:
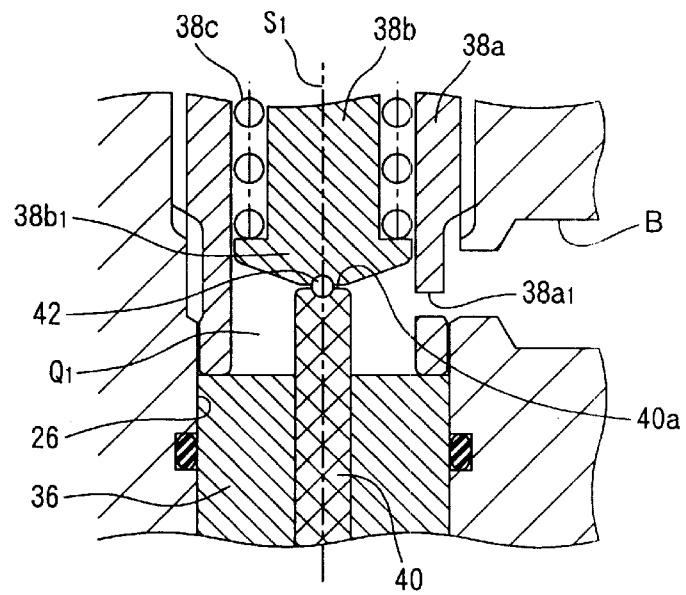
FIG. 2 is an enlarged illustration of a pilot chamber in the first embodiment.

As shown in FIG. 2, the lower end portion 38b1 of the piston position setting member 38b for moving the pilot piston 40 in the direction of axis S1 is formed into a substantially truncated cone shaped configuration. An outer diameter of the lower end portion 38b1 is set slightly smaller than an inner diameter of the cylinder body 38a for defining a gap for passing a fluid therethrough between the outer periphery of the lower end portion 38b1 and the inner periphery of the cylindrical body 38a.

At a position on the lower surface of the lower end portion 38b1 where the axis S1 passes, and at a position on the upper end surface 40a of the pilot piston 40 where the axis S1 passes, spherical recessed portions are formed respectively. In these recessed portions, spherical body 42 is arranged. By this, the piston position setting member 38b contacts the pilot piston 40 via the spherical body 42.

Furthermore, as shown in FIG. 2, in the lower portion of the cylindrical body 38a, a communication hole 38a1 is formed. The communication hole 38a1 communicates an internal space Q1 of the cylindrical body 38a defined between the lower end portion 38b1 of the piston position setting member 38b and the upper portion of the cylindrical member 36, and the pilot port B.

Here, as shown in FIG. 1, the pilot port B is connected to a pilot pressure setting portion 44 and the pilot pressure Pp set at the predetermined value in the pilot pressure setting portion 44 is supplied to internal space Q1 of the cylindrical body 38a via the pilot port B and the communication hole 38a1. On the other hand, a working fluid flowing in the pressure circuit 46 can flow into the relief port A.

Figure 3:
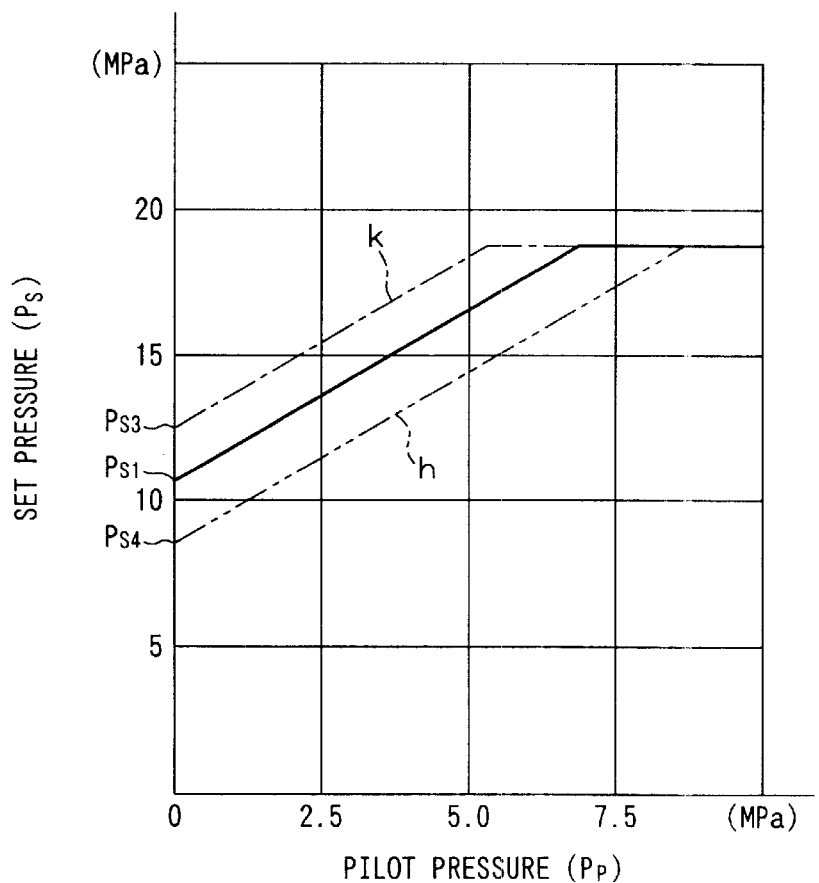
FIG. 3 is a set pressure control chart using the pressure control valve of the first embodiment.

The relief valve 20 maintains the inside of the pressure circuit 46 at a predetermined set pressure PS1, illustrated in FIG. 3, since the poppet valve spring 32 biases the poppet valve 30 onto the seat surface $A_s$ by the spring force thereof. When the pressure inside of the pressure circuit 46 increases to be higher than or equal to the set pressure PS1, the poppet valve 30 is lifted up against the spring force of the poppet valve spring 32 to open the relief port A to flow out the fluid in the pressure circuit 46 to the drain port D to lower the pressure in the pressure circuit 46. When the pressure in the pressure circuit 46 reaches the set pressure PS1, the poppet valve 30 is lowered by the spring force of the poppet valve spring 32 to close the relief port A. The inside pressure of the pressure circuit 46 is maintained at the set pressure PS1.

On the other hand, when the pilot pressure Pp is supplied from the pilot pressure setting portion 44, a thrust acts on the pilot piston 30 by the pressurized fluid flowing into the internal chamber Q1 to move the pilot piston 40 downwardly. Then, since the piston stoke transmitting portion 34 is biased together with the pilot piston 40, the spring force of the poppet valve spring 32 with shortened spring length is increased. When the spring force of the poppet valve spring 32 is increased, a force biasing the poppet valve 30 onto the seat surface As is increased to modify the set pressure PS1 to another set pressure PS2 greater than the set pressure PS1 (PS2>PS1). On the other hand, even when the initial value adjusting portion 38 is actuated, the set pressure PS1 can be modified.

Particular modification of the set pressure PS1 of the foregoing relief valve 20 will be discussed with reference to the set pressure control chart of FIG. 3. It should be noted that the initial value adjusting portion 38 had increased the spring force of the poppet valve spring 32 by pushing down the pilot piston 40 toward the valve chamber 24.

When the pilot pressure Pp is 0 MPa, namely the pilot pressure Pp from the pilot pressure setting portion 44 is not supplied, by the acting the spring force of the poppet valve spring 32 on the poppet valve 30, an initial set pressure (about 10.5 MPa) is established as position PS1 shown by solid line. On the other hand, when the pilot pressure Pp is supplied from the pilot pressure setting portion 44, a downward stroke of the pilot piston 40 is initiated to increase spring force by the shortening of the spring length of the poppet valve spring 32 to linearly increase the set pressure Ps as shown by the solid line based at least in part on the increase of the value of the pilot pressure Pp. When the pilot pressure Pp becomes higher than or equal to about 7.0 Mpa, a spring force of the poppet valve spring 32 depressed by the pilot piston 40 becomes maximum. Therefore, the set pressure Ps becomes constant value (about 19.0 Mpa). On the other hand, by decreasing of the pilot pressure Pp, the spring length of the poppet valve spring 32 becomes longer to reduce the spring force. Therefore, the set pressure Ps is reduced linearly.

When threading an amount of the adjusting screw 38d of the initial value adjusting portion 38 engaged with cylindrical body 38a is increased to increase spring force of the initial value adjusting spring 38c, the piston position setting member 38b biased by the initial value adjusting spring 38c moves the pilot piston 40 downwardly. Since the spring length of the poppet valve spring 32 is shortened to increase the spring force, an initial set pressure PS3 greater than the initial set pressure PS1 of the solid line set forth above is established. When a supply pressure of the pilot pressure Pp is varied, a control line (set pressure control line shown by k of FIG. 3) modified to the set pressure of a greater value than the set pressure control line shown by the solid line can be obtained.

On the other hand, when a threading amount of the adjusting screw 38d of the initial value adjusting portion 38 is decreased, the spring force of the initial value adjusting spring 38c is reduced to move the pilot spring 32 upwardly. By this, the spring length of the poppet valve spring 32 becomes longer to reduce the spring force. Therefore, an initial set pressure PP4 smaller than the initial set pressure PS1 shown by solid line is established. Then, when the supply pressure of the pilot pressure Pp is varied, the control line (set pressure control line shown by h) modified to the set pressure of the smaller value than the set pressure control line shown by the solid line can be obtained.

Thus, the shown embodiment of the relief valve 20 varies the shifting amount of the pilot piston 40 in the axial direction S1 by the operation of the initial value adjusting portion 38 and input of the pilot pressure Pp to the pilot port B, whereby an increase or a decrease in the spring force of the poppet valve spring 32 can freely modify the set pressure Ps. Therefore, the working fluid pressure of the pressure circuit 46 can be automatically controlled in a step-less manner.

Moreover, with a simple mechanism which moves the pilot piston 40 in the direction of axis S1, the initial value of the set pressure PS can be set freely, so that the relief valve 20 can be produced with significantly reduced cost.

Furthermore, since hydraulic pressure is used as the pilot signal, in comparison with the proportioning electromagnetic type pressure control portion using the electrical pilot signal, sufficient measure can be provided in view of safety, such as avoiding a fire.

Figure 4:
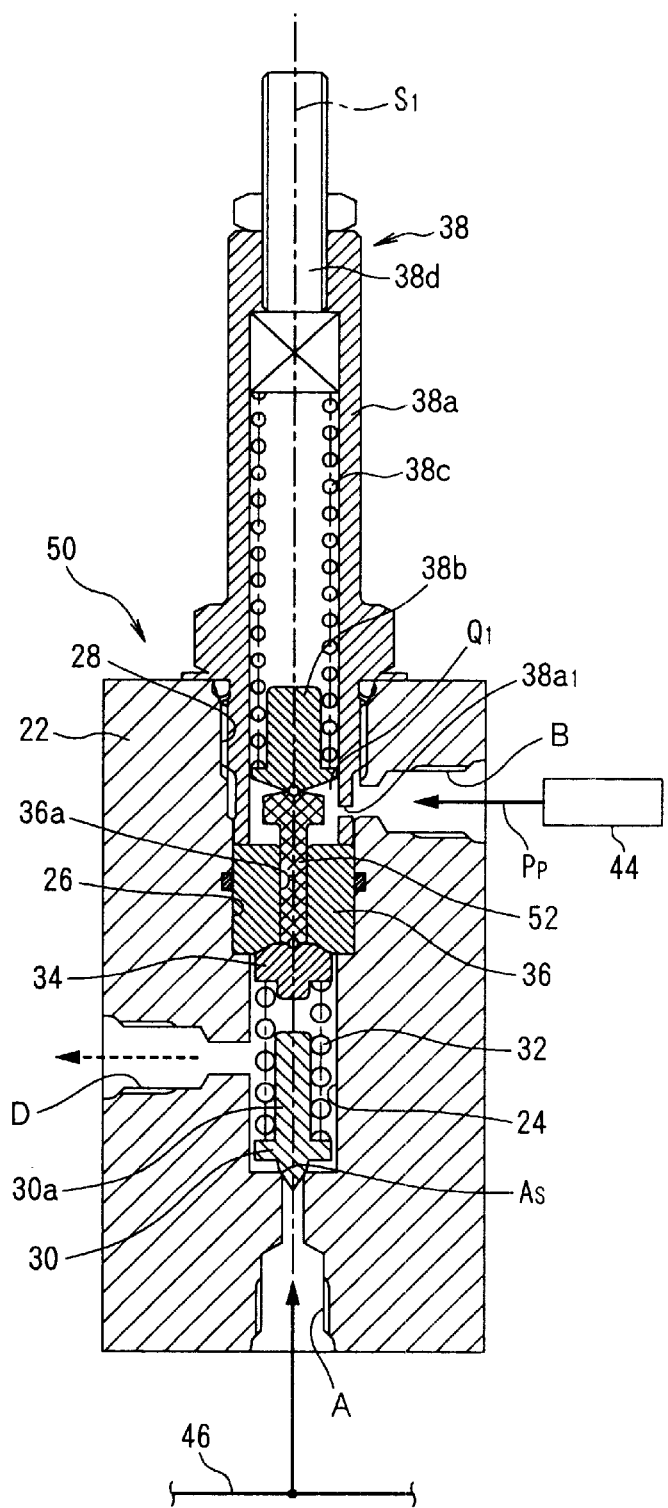
FIG. 4 is an illustration showing the second embodiment of a pressure control valve according to the present invention.
Figure 5:
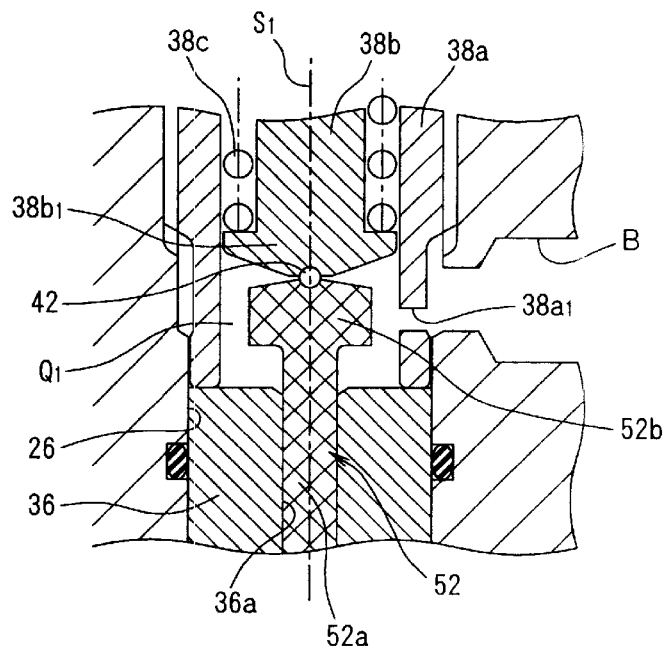
FIG. 5 is an enlarged illustration of a pilot chamber in the second embodiment.

Next, illustrated in FIGS. 4 and 5 is the second embodiment of the relief valve 50 according to the present invention. Like components to the foregoing first embodiment will be identified by like reference numerals, and detailed description thereof will be eliminated.

The relief valve 50 of the shown embodiment includes a pilot piston 52 which has longer length than the length in the axial direction of the cylinder member 36, the pilot piston 52 slidably inserted in a piston bore 36a of the cylinder member 36.

As shown in FIG. 5, the pilot piston 52 is a member having a piston body portion 52a of circular cross section and inserted into the piston bore 36a and a piston head 52b formed to have greater outer diameter than the piston body portion 52a and located within the internal or pilot chamber Q1.

A spherical body 42 is arranged between a spherical surface form or recessed portion formed at a position on the upper end surface of the piston head 52b through which the axis S1 extends, and a spherical surface form or recessed portion formed on the lower end portion 38b1 of the piston position setting member 38b. Through the spherical body 42, the piston position setting member 38b and the pilot piston 50 are contacted.

Next, particular modification of the set pressure PS of the shown embodiment of the relief valve 50 will be discussed with reference to the set pressure control chart of FIG. 6 and illustrations of FIGS. 7(a) to 9(b).

FIG. 7(a) shows an arrangement of the pilot piston 52 in the case of the relief valve 50 having the lower limit value of the set pressure and the upper limit value of the set pressure. In this case, threading amount of the adjusting screw 38d of the initial value adjusting portion 38 is significantly reduced to set the initial value adjusting spring 38c to a free length to contact the piston position setting member 38b to the pilot piston 52.

By this, the spring force of the initial value adjusting spring 38c does not apply a downward force to the pilot spring 52.

By arranging the pilot piston 52 in such a manner, when the pilot pressure Pp is a small value, even if a small thrust of the pilot pressure Pp acts on the upper end surface of the pilot piston 52, since the spring force of the poppet valve spring 32 is greater than the thrust, the pilot piston 52 does not move downwardly and the poppet valve 30 is biased onto the seat surface $A_s$ at a constant spring force of the poppet valve spring 32. Therefore, the lower limit of the set pressure $PS_{min}$ is set.

When the pilot pressure Pp is elevated and increased thrust exceeds the spring force of the poppet valve spring 32, the pilot piston 52 moves downwardly apart from the piston position setting member 38b as shown in FIG. 7(b). The poppet valve spring 32 is shortened by the portion or piston stroke transmitting member 34. By this, the spring force of the poppet spring 32 is increased to increase the force for biasing the poppet valve 30 onto the seat surface $A_s$. Therefore, the set pressure PS is linearly increased. Then, when the piston head portion 52b of the pilot piston 52 abuts against the upper surface 36a of the cylinder member 36, the spring force of the poppet valve spring 32 becomes maximum. Therefore, the upper limit of the set pressure $PS_{max}$ is set.

Figure 6:
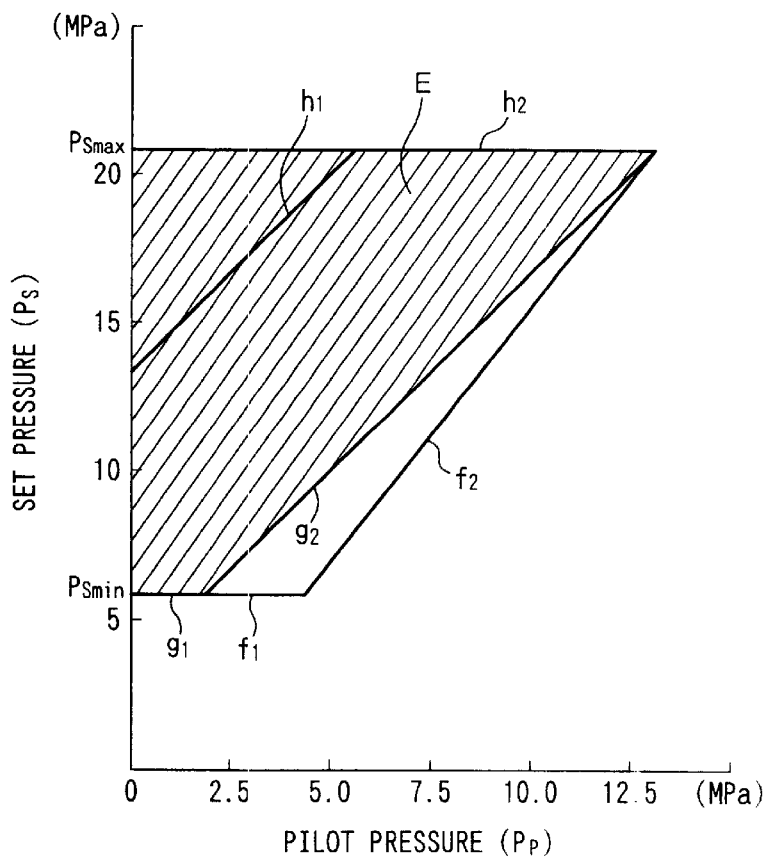
FIG. 6 is a set pressure control chart using the pressure control valve of the second embodiment.

Accordingly, as shown in $f_1$ and $f_2$ in FIG. 6, the lower limit of the set pressure $PS_{min}$ and the upper limit of the set pressure $PS_{max}$ and a set pressure control chart linearly varying the set pressure PS between the lower limit of the set pressure $PS_{min}$ and the upper limit of the set pressure $PS_{max}$ is obtained.

Next, FIG. 8(a) shows an arrangement of the pilot piston 52 in the case where the lower limit of the set pressure $PS_{min}$ is reset by the pilot pressure Pp of small value. In this case, the threading amount of the adjusting screw 38d of the initial value adjusting portion 38 is increased (moving the adjusting screw 38d downward) to abut the piston position setting member 38d onto the pilot piston 52. At this time, spring force of the initial value adjusting spring 38c for biasing the pilot piston 52 downwardly, and the spring force of the poppet valve spring 32 biasing the pilot piston 52 downward balances to contact the piston stroke transmitting member 34 onto the lower surface of the cylinder member 36.

When the pilot piston 52 is so arranged, a pilot pressure Pp of small value is supplied to provide a small thrust on the upper end surface of the piston of the pilot piston 52, the pilot piston 52 moves downwardly to make the spring length of the poppet valve spring 32 shorter via the piston stroke transmitting member 34 to increase force for biasing the poppet valve 30 onto the seat surface $A_s$, as shown in FIG. 8(b).

By this, as shown by solid lines $g_1$ and $g_2$ of FIG. 6, the lower limit of the set pressure $PS_{min}$ is set when the pilot pressure is of small value (about 2.0 MPa), according to the set pressure control chart and the set pressure PS can linearly increase when a pilot pressure Pp greater than or equal to the small value is supplied. Here, when the upper limit of the set pressure $PS_{max}$ is set, the initial value of the adjusting spring 38c becomes free length.

Figure 9A:
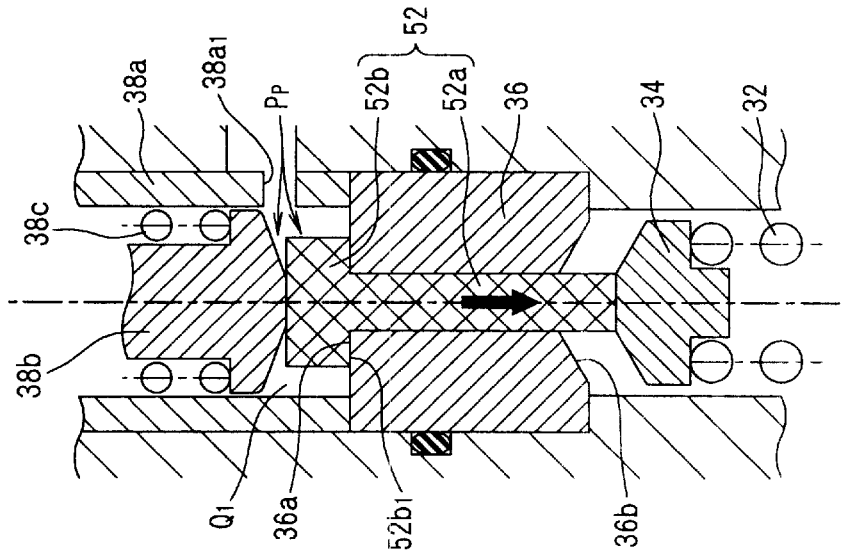
FIG. 9($a$) is an illustration showing a third arrangement example of a pilot piston forming the second embodiment of the pressure control valve.

Next, FIG. 9(a) shows an arrangement of the pilot piston where the initial value of the set pressure PS is modified to greater value. In this case, the threading amount of the adjusting screw 38d of the initial value adjusting portion 38 is further increased (the adjusting screw 38d further is moved downward with respect to FIG. 8), and providing a predetermined clearance C1 between the piston head 52b of the pilot piston 52 and the upper surface 36a of the cylinder member 36, the pilot piston 52 is moved downward via the piston position setting member 38b by the spring force of the initial value adjusting spring 38c. At this time, since the poppet valve spring 32 is shortened, the spring length is depressed by the pilot piston 52 before the pilot pressure Pp is supplied and the initial spring force biases the poppet valve 30 to the seat surface As increases.

Figure 9B:
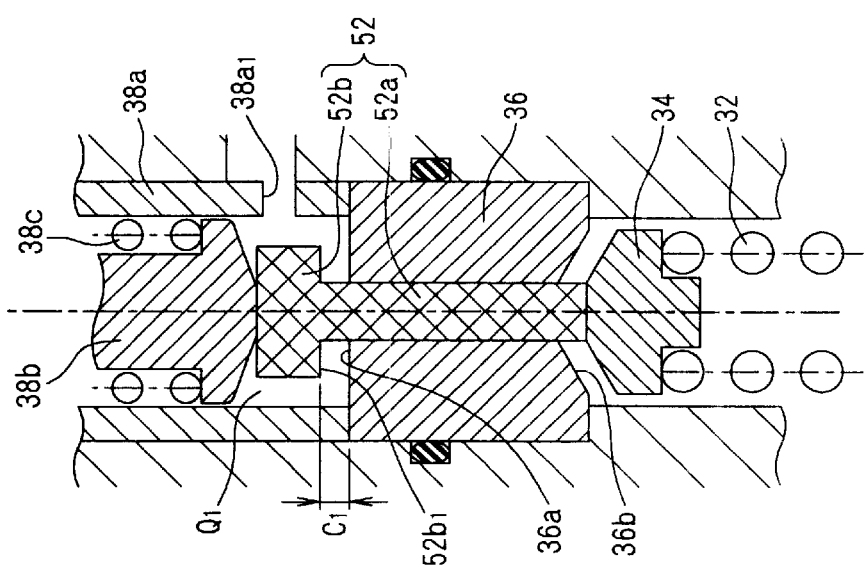

By arranging the pilot piston 52 as set forth above, when the pilot pressure Pp is input, the spring force of the poppet valve spring 32 is increased by moving the pilot piston 52 downwardly. Then, as shown in FIG. 9(b), the maximum spring force of the poppet spring 32 is set at a timing (C1=0) when the piston head 52b of the pilot piston 52 contact with the upper surface 36a of the cylinder member 36. By this, as shown by solid line $h_1$ and $h_2$ of FIG. 6, set pressure control chart modified to the set pressure PS at a large value can be obtained.

Here, as arrangement of the pilot piston 52 is shown in FIG. 9(b) in which the piston head portion 52b of the pilot piston 52 abuts the upper surface 36a of the cylinder member 36 before the pilot pressure Pp is supplied. Irrespective of the pilot pressure Pp, the relief valve 50 is constantly set to the upper limit and the set pressure $PS_{max}$ is obtained.

As set forth, with the shown embodiment, the relief valve 50 can define the lower limit of the set pressure $PS_{min}$ by effecting the pilot pressure Pp flowing into the pilot chamber Q1 to thrust against the spring force of the poppet valve spring 32 with the pilot piston 52. Also, when the pilot piston 52 is arranged so that the piston head 52b and the upper surface 36a of the cylinder member 36 contact during elevation of the pilot pressure PP, the relief valve 50 having the upper limit set value $PS_{max}$ can be obtained.

On the other hand, by applying the spring force of the initial value adjusting spring 38c, applied or released by actuation of the initial value adjusting portion 38, the set pressure PS can be freely modified within a range E shown by hatched area in FIG.

Accordingly, the shown embodiment of the relief valve 50 can set the upper limit of the set pressure $PS_{max}$ or the lower limit of the pressure $PS_{min}$ and furthermore the set pressure can be freely modified in wide range. Therefore, in comparison with the first embodiment of the relief valve 29, the set pressure of the working hydraulic pressure of the pressure circuit 46 can be automatically controlled in the wider range.

Figure 10:
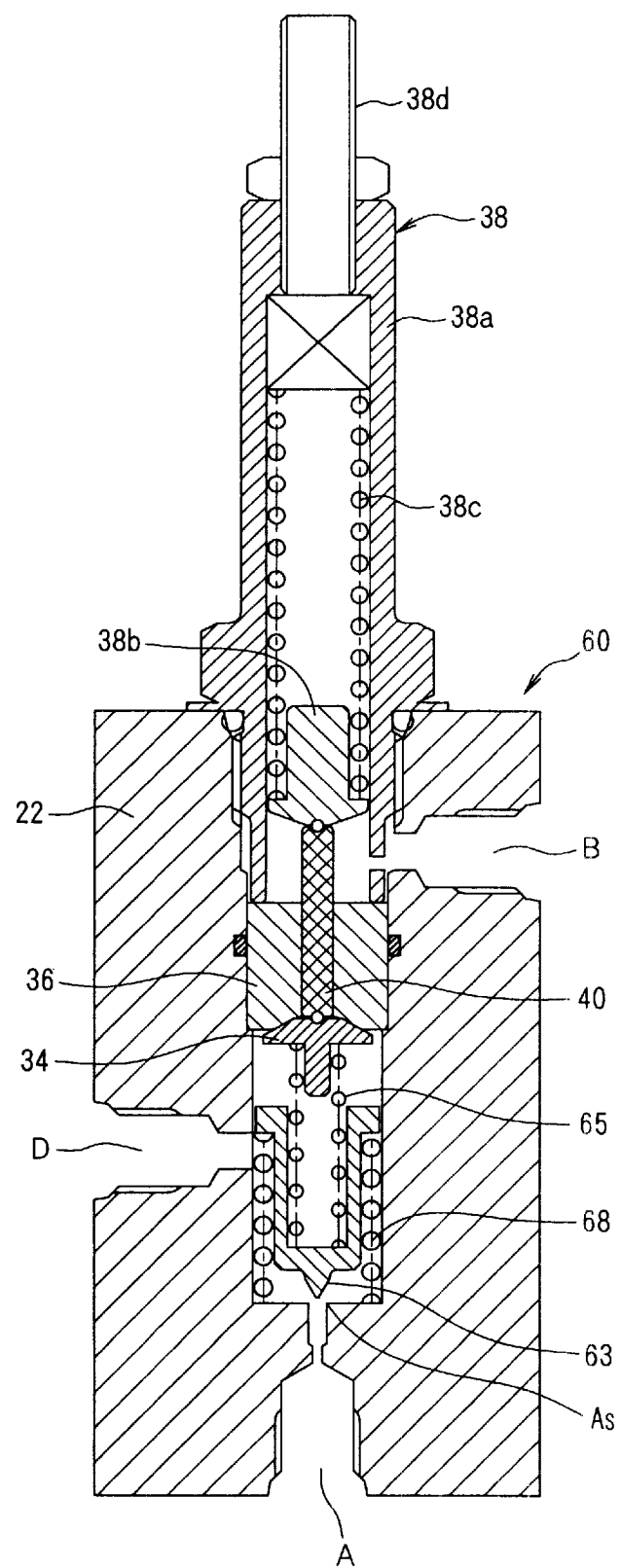
FIG. 10 is a longitudinal section showing a construction of the third embodiment of the pressure control valve.
Figure 11C:
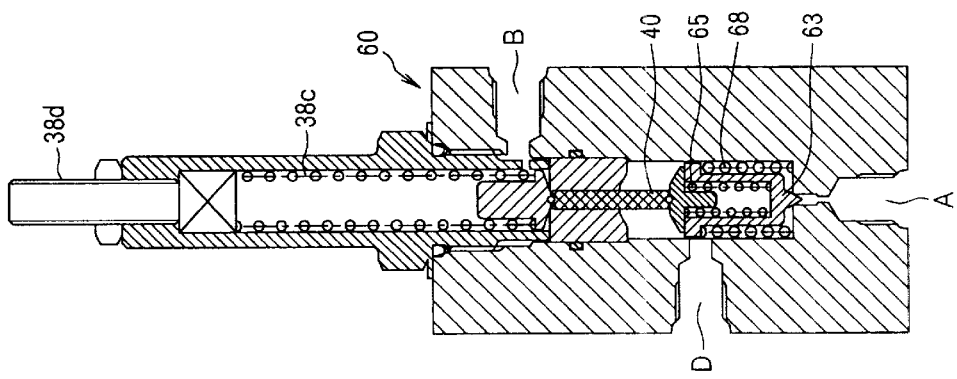
FIG. 11($a$) is an explanatory illustration showing actuation of the third embodiment of the pressure control valve.
Figure 11B:
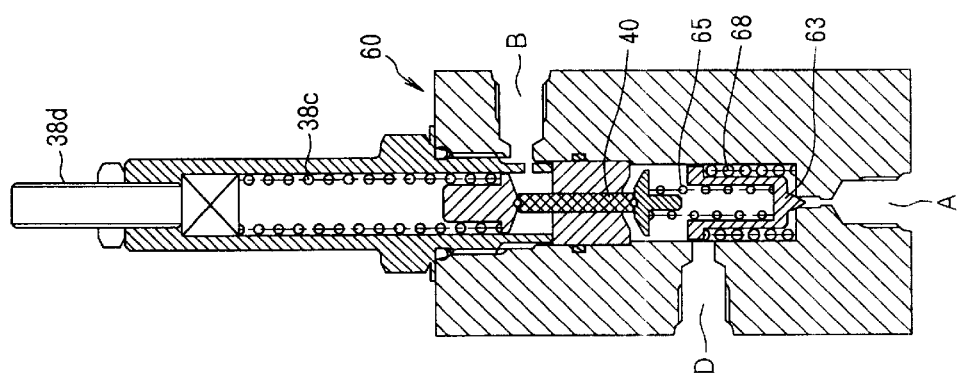
Figure 11A:
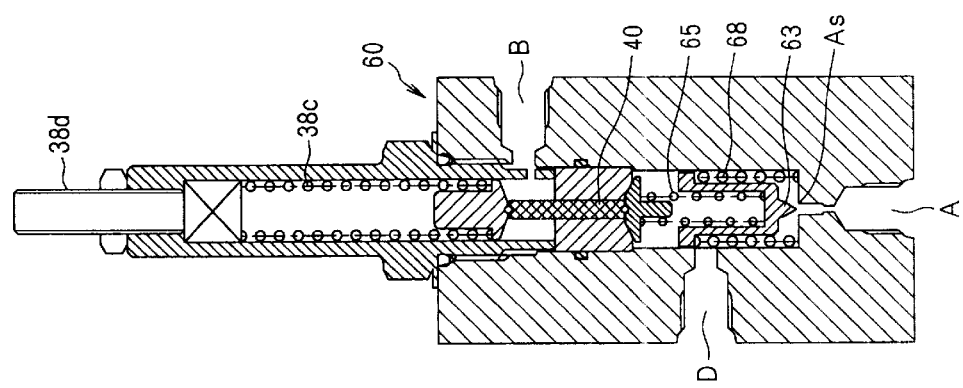
Figure 12:
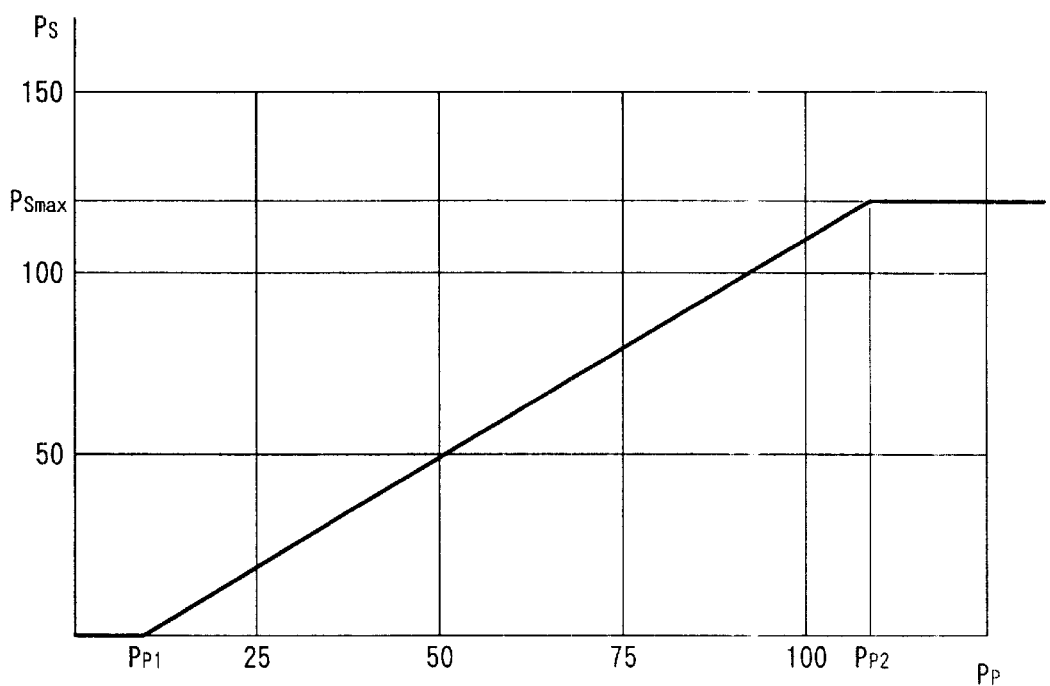
FIG. 12 is a pressure control chart of the third embodiment of the pressure control valve.
Figure 13:
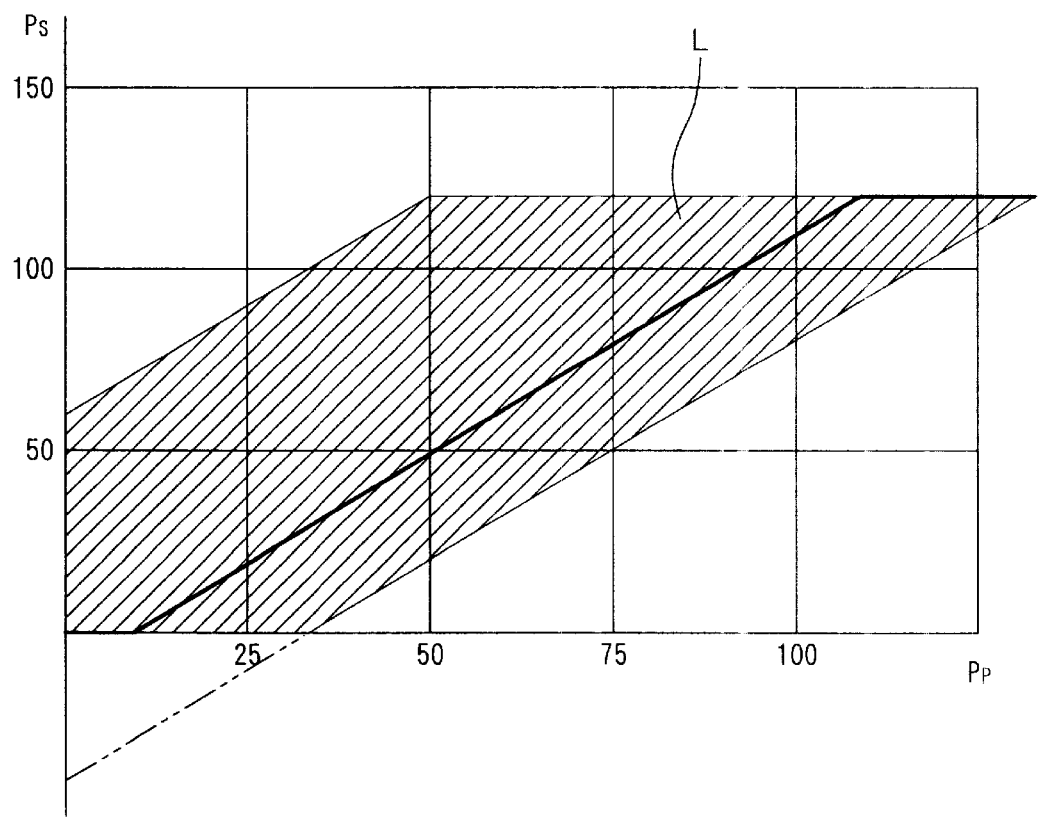
FIG. 13 is an explanatory illustration showing a pressure control range of the third embodiment of the pressure control valve.
Figure 14:
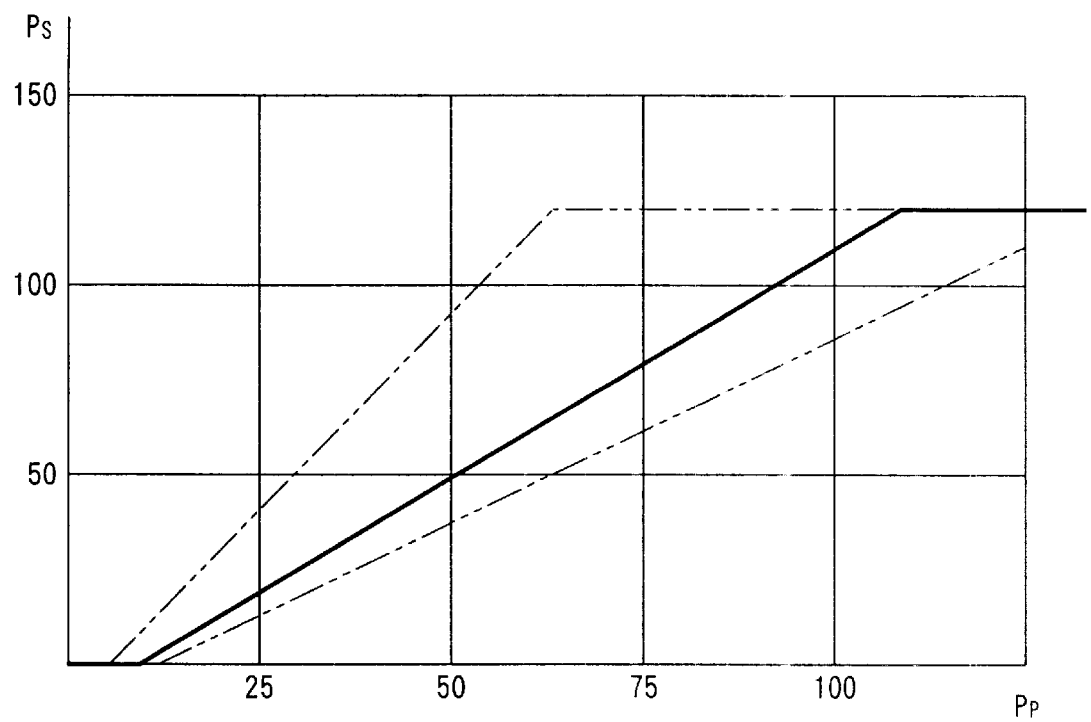
FIG. 14 is an explanatory illustration showing variation of the pressure control chart in the case where a ratio of a pressure receiving areas between a valve body of the third embodiment of the pressure control valve and a pilot piston.

FIG. 10 is a longitudinal section showing a construction of the third embodiment of the pressure control valve according to the present invention, FIGS. 11(a)–11(c) are explanatory illustrations showing actuation of the pressure control valve, FIG. 12 is a pressure control chart of the pressure control valve, FIG. 13 is an explanatory illustration showing a pressure control range of the pressure control valve, and FIG. 14 is an explanatory illustration showing variation of the pressure control chart in the case of a ratio of a pressure receiving areas between a valve body and a pilot piston of the pressure control valve. The same components to the first embodiment will be identified by the same reference numerals and discussion therefor will be eliminated.

A pressure control valve 60 includes a valve body 63 opening and closing a relief port A, a biasing spring 65 for biasing the valve body 63 toward the sheet surface $A_s$ (closing side), the pilot piston 40 pushing the biasing spring 65 toward closing side by the pilot pressure input from the pilot port B, the initial value adjusting spring 38c for biasing the pilot piston 40 toward closing side, and a return spring 68 for pushing back the valve body 63 toward opening side. The initial value adjusting spring 38c being designed for adjusting the biasing force by the adjusting screw 38d.

In the pressure control valve 60, biasing forces of the biasing spring 65, the initial value adjusting spring 38c and the return spring 68 are set at such values that when the pilot pressure Pp is not input from the pilot port B, the valve body 63 is pushed toward opening side by the return spring 68, to be moved away from the seat surface $A_s$ to open the relief port A as shown in FIG. 11(a) and the pressurized fluid flows out from the drain port D.

Even when the pilot pressure Pp is input, if the pilot pressure Pp falls within a range lower than or equal to a predetermined pressure PP1, the valve body 63 is held at the open position as shown in FIG. 11(a). Accordingly, in this range, the set pressure PS of the relief port A is set to 0.

When the pilot pressure Pp exceeds the predetermined pressure PP1, since a force of the pilot piston 40 biasing the bias spring 65 toward closing side is increased, the valve body 63 is biased onto the seat surface $A_s$ to close the relief port A, as shown in FIG. 11(b). Then, as shown in FIG. 13, the pilot pressure Pp falls within a range of PP1 to PP2, the pressure of the relief port A is linearly controlled by the input pilot pressure Pp.

When the pilot pressure Pp is elevated up to PP2, the pilot piston 40 reaches the stroke end as shown in FIG. 11(c). When the pilot pressure Pp is in a range higher than or equal to PP2, the pressure of the relief port A becomes constant at the upper limit of the set pressure $PS_{max}$.

This pressure control valve 60 is adjustable with respect to the biasing force of the initial value adjusting spring 38c by the adjusting screw 38d to modify controllable range L as shown by hatched area in FIG. 13.

On the other hand, by varying a ratio of the pressure receiving areas of the valve body 63 and the pilot piston 40, the ratio of variation of the pressure Ps of the relief port A corresponding to variation of the pilot pressure Pp can be modified.

Figure 15:
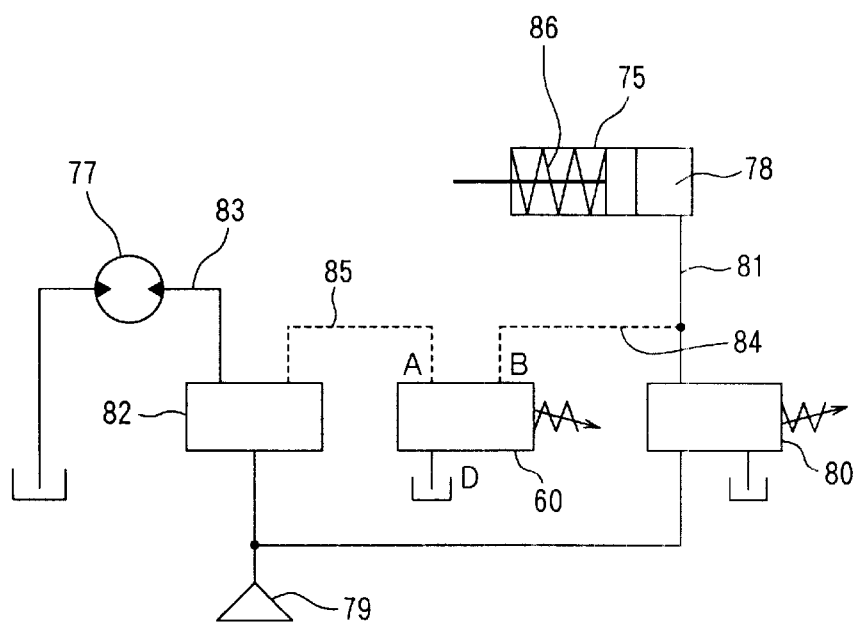
FIG. 15 is a diagram of a hydraulic control circuit of a hydraulic motor of a roof cleaning device employing the pressure control valve according to the present invention.
Figure 16:
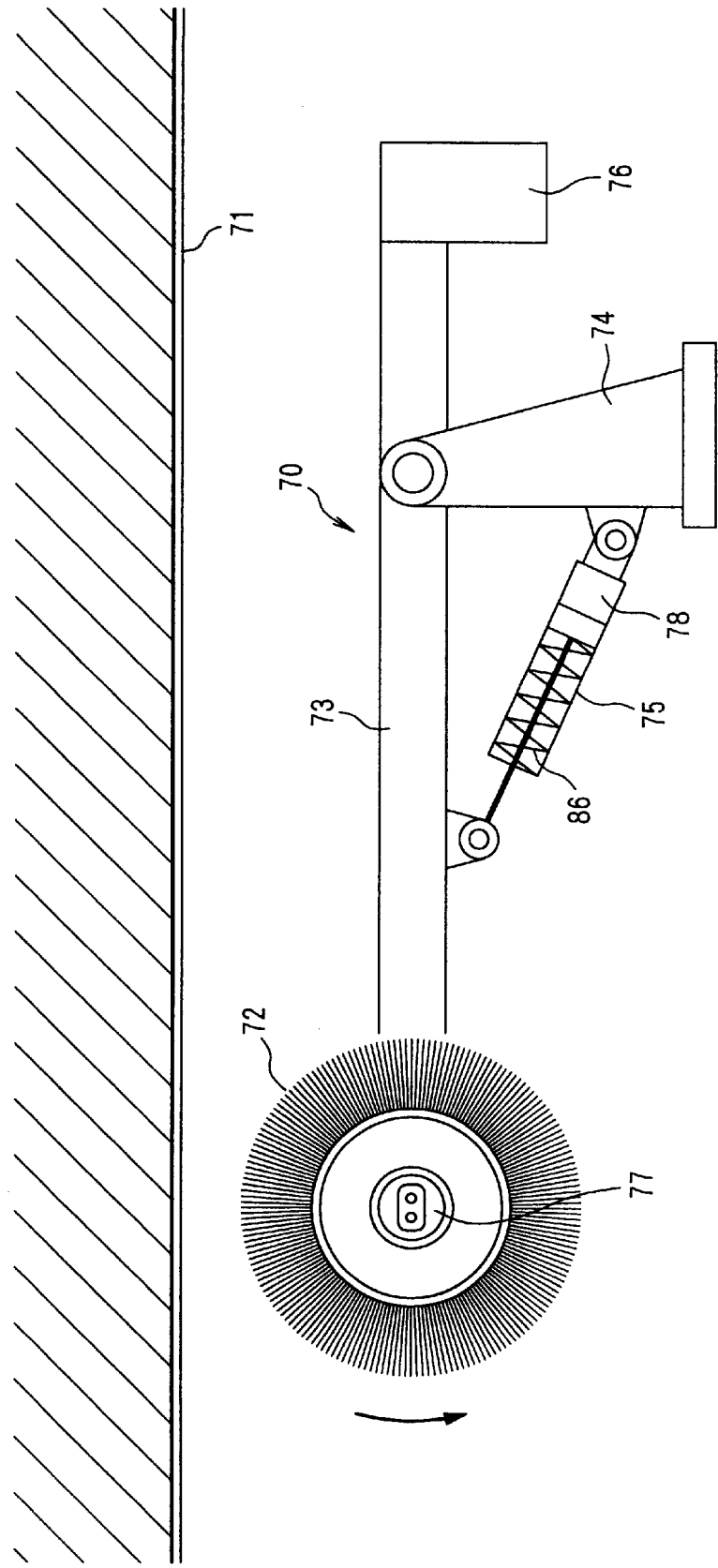
FIG. 16 is a side elevation of a roof cleaning device.
Figure 17A:
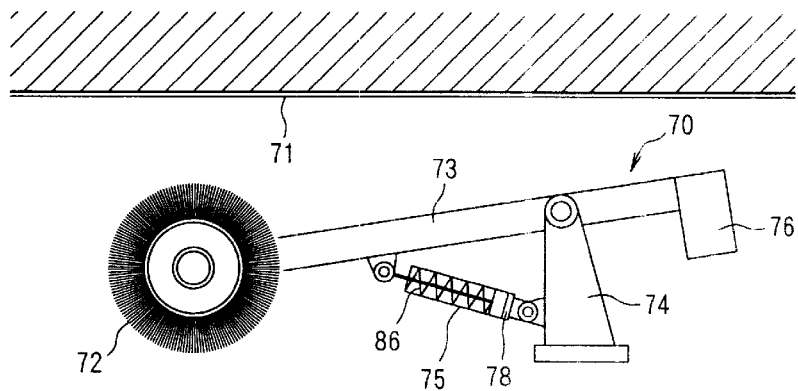
FIG. 17($a$) is an explanatory illustration showing actuation of the roof cleaning device.
Figure 17B:
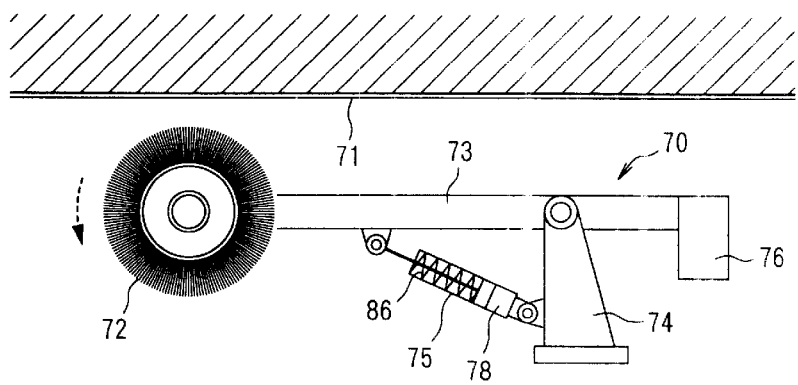

FIG. 15 is a diagram of a hydraulic control circuit of a hydraulic motor of a roof cleaning device employing the pressure control valve according to the present invention, FIG. 16 is a side elevation of a roof cleaning device, and FIGS. 17(a)–17(b) are explanatory illustrations showing actuation of the roof cleaning device.

The roof cleaning device 70 has an arm 73 pivotably supported on a base 74. The arm 73 supports a rotary brush 72 at a tip end and provided with a balance weight 76 at the other end, and an elevating cylinder being provided between the base 74 and the arm 73. By expansion and contraction of the elevating cylinder 75, the rotary brush 72 is elevated up and down. The rotary brush 72 is rotated by means of a hydraulic motor 77.

To a fluid chamber 78 of the elevating cylinder 75, a hydraulic pump 79 is connected with the cylinder actuation piping 81 via a pressure reduction valve 80. To the hydraulic motor 77, a motor actuation piping 83 is connected from the hydraulic pump 79 via the pressure reduction valve 82. From the cylinder actuation piping 81, the pilot piping 84 is connected to the pilot port B of the pressure control valve 60. To the relief port A of the pressure reduction valve 60, an actuation pressure control piping 85 of the pressure control valve 60 is connected.

The roof cleaning device 70 is mounted on a traveling carriage (not shown) and biases the rotary brush 72 by extending the elevating cylinder 75 to urge the rotary brush 72 onto the roof 71 of the tunnel or the like. By actuating the hydraulic motor 77, the rotary brush 72 is rotated to clean the roof 71. Adjustment of urging force for urging the rotary brush 72 onto the roof 71 can be performed by adjusting the hydraulic pressure supplied to the fluid chamber 78 of the elevating cylinder 75 from the cylinder actuation piping 81 by means of the pressure reduction valve 80 by an operator.

By making the urging force onto the roof 71 greater, a rotating force of the rotary brush 72 has to be made greater. Therefore, when the hydraulic pressure of the cylinder actuating piping 81 is increased, the hydraulic pressure of the motor actuating piping 83 has to be increased. However, the rotary brush 72 may be rotated in the condition contacting with the roof 71. When the hydraulic pressure of the cylinder actuation piping 81 is low, it is preferred to stop rotation for safety. Such control may be performed automatically by the pressure control valve 60.

When the hydraulic pressure of the cylinder actuation piping 81 is low, the elevating cylinder 75 is placed at the most contracted position by own weight of the rotary brush 72 and the force of the return spring 86 of the elevating cylinder 75 to place the rotary brush 72 at lowered position as shown in FIG. 17(a). At this time, the hydraulic pressure of the cylinder actuation piping 81 is input from the pilot piping 84 to the pilot port B of the pressure control valve 60. If the pilot pressure Pp falls within a range lower than or equal to the predetermined pressure PS1, the hydraulic pressure Ps of the relief port A is maintained 0, and the pressure of the hydraulic pressure motor actuation piping 83 also becomes 0 so as not to cause rotation of the rotary brush 72.

When the hydraulic pressure of the cylinder actuation piping 81 is increased, the elevating cylinder 75 is expanded to lift up the rotary brush 72, as shown in FIG. 17(b). At this time, by increasing of the pilot pressure Pp input to the pilot port B of the pressure control valve 60 from the pilot piping 84, the hydraulic pressure PS of the relief port A is increased to also increase pressure in the hydraulic pressure motor actuation piping 83. Thus, the rotary brush 72 starts rotation.

Figure 17C:
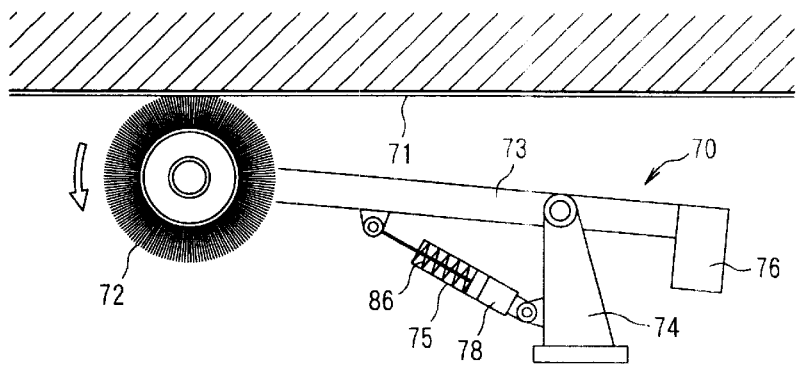

As shown in FIG. 17(c), the rotary brush 72 contacts with the roof 71, and cleaning operation is performed. At this time, by adjusting the hydraulic pressure of the cylinder actuation piping 81 to high pressure, the rotary brush 72 is urged onto the roof 71 by the elevating cylinder 75. Then, a pressure corresponding to the contact reaction force is input to the pilot port B of the pressure control valve 60 as the pilot pressure Pp from the pilot piping 84. Therefore, increasing and decreasing of the pilot pressure Pp is associated with the hydraulic pressure Ps of the relief port A being increased or decreased to increase or decrease the pressure of the hydraulic pressure motor actuation piping 83. The rotary brush 72 is rotated at a pressure corresponding to the contact reaction force.

Figure 18:
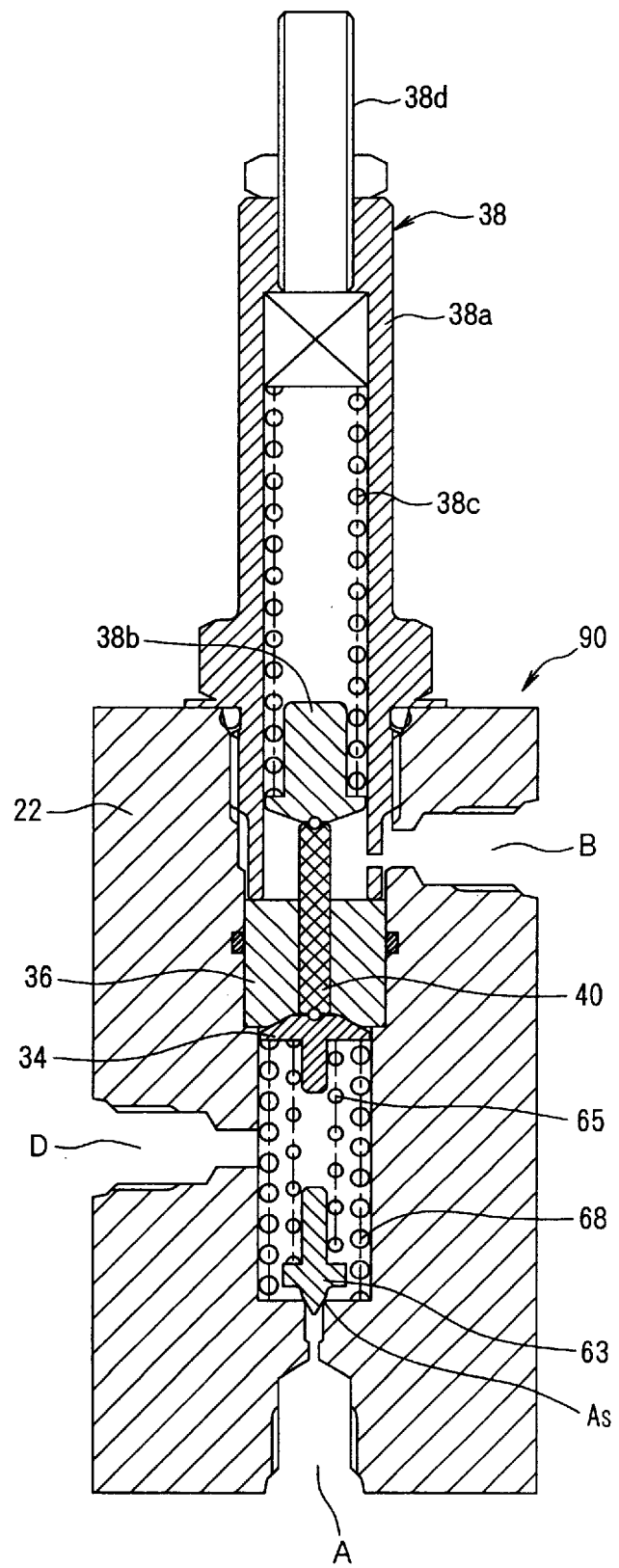
FIG. 18 is a longitudinal section showing a construction of the fourth embodiment of the pressure control valve.
Figure 19:
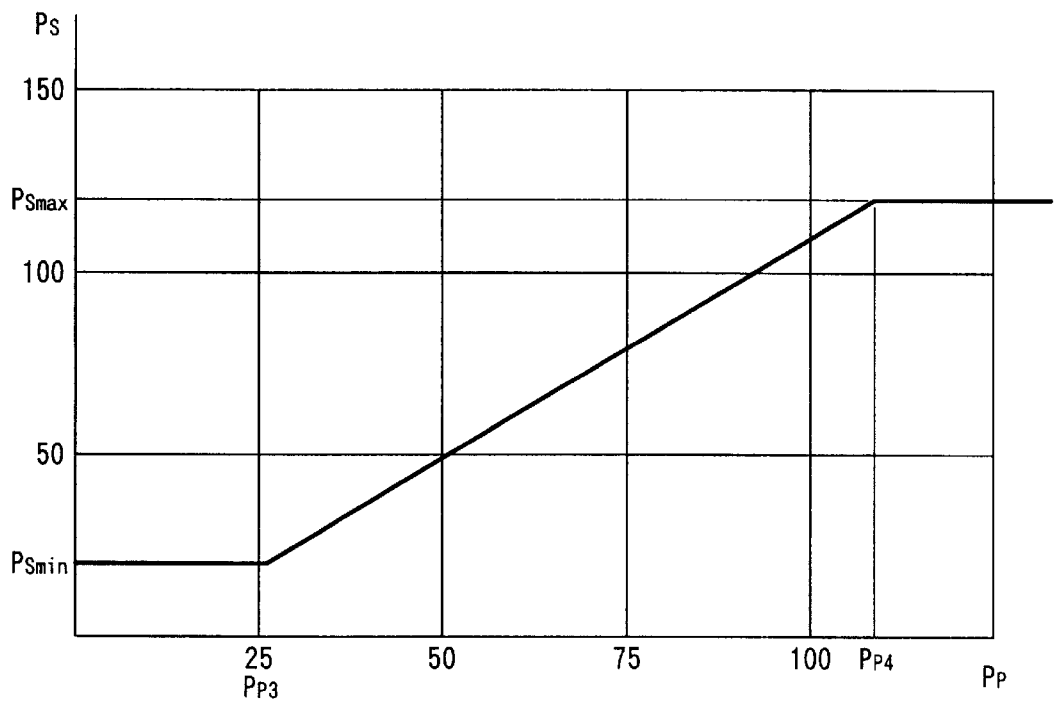
FIG. 19 is a pressure control chart of the fourth embodiment of the pressure control valve.
Figure 20:
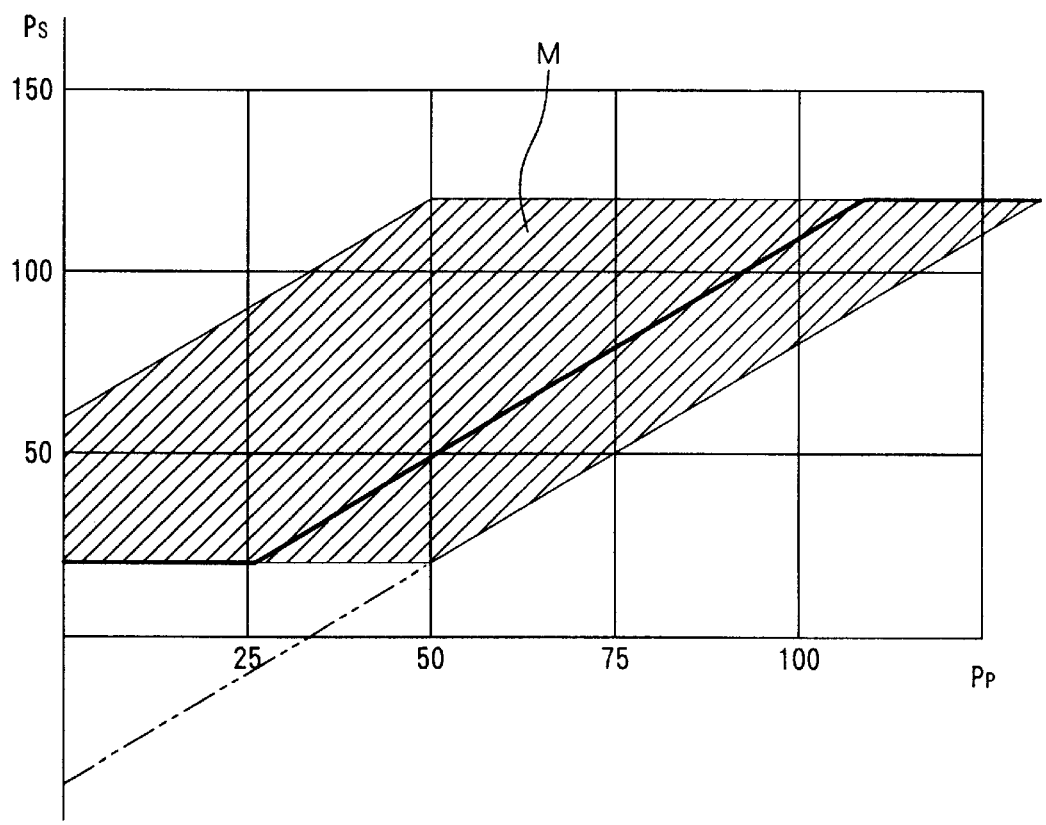
FIG. 20 is an explanatory illustration showing a pressure control range of the fourth embodiment of the pressure control valve.
Figure 21:
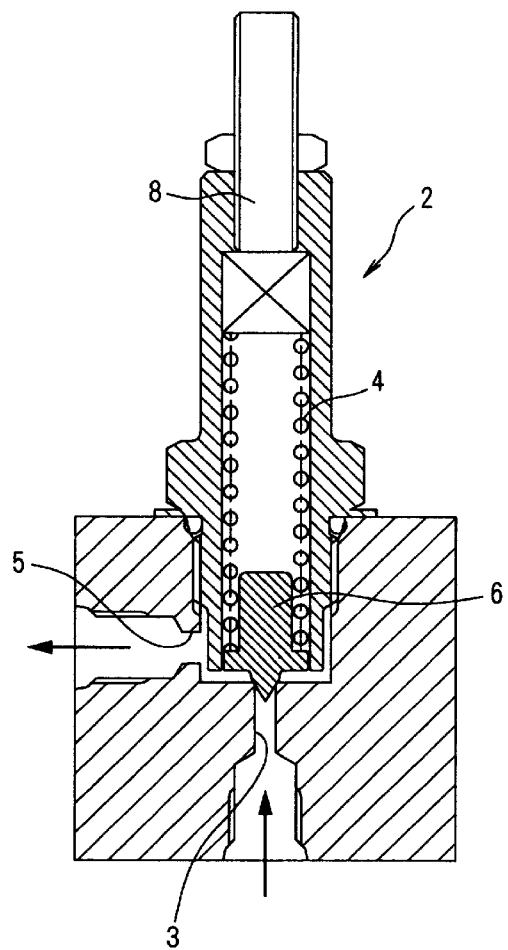
FIG. 21 is an illustration showing the conventional direct acting type relief valve.
Figure 22:
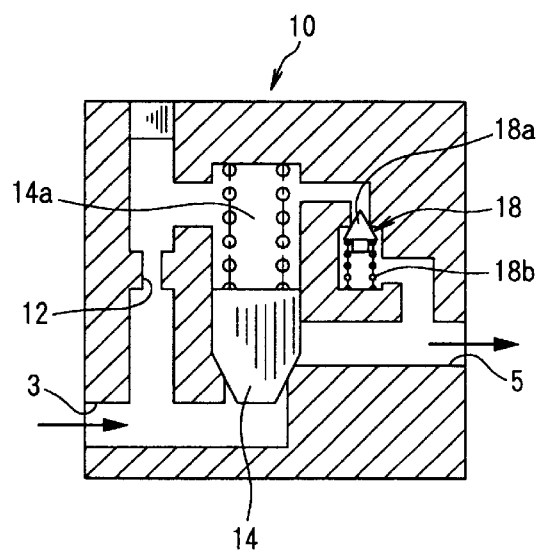
FIG. 22 is an illustration showing the conventional pilot actuation type relief valve.

FIG. 18 is a longitudinal section showing a construction of the fourth embodiment of the pressure control valve, FIG. 19 is a pressure control chart of the pressure control valve of FIG. 18, and FIG. 20 is an explanatory illustration showing a pressure control range of the pressure control valve of FIG. 18.

A pressure control valve 90 is set with a biasing force of the bias spring 65, the initial valve adjusting spring 38c and the return spring 68 for biasing the valve body 63 onto the seat surface $A_s$ to close the relief port A when the pilot pressure Pp from the pilot port B is not input.

Accordingly, as shown in FIG. 19, when the pilot pressure Pp is 0, the pressure Ps of the relief port A is set to the lower limit set pressure $PS_{min}$. When the pilot pressure is in a range lower than or equal to the predetermined pressure PP3, the pressure Ps at the relief port A is held at $PS_{min}$.

When the pilot pressure Pp falls within a range of PP3 to PP4, the pressure Ps of the relief port A is linearly controlled by the input pilot pressure Pp.

When the pilot pressure Pp is elevated to PP4, the pilot piston 6 reaches the stroke end. Therefore, in a range where the pilot pressure Pp is higher than or equal to PP4, the pressure Ps of the relief port A becomes constant at the upper limit set pressure $PS_{max}$.

The pressure control valve 90 can modify a controllable range M as shown in FIG. 20, by adjusting the biasing force of the initial value adjusting spring 38c by the adjusting screw 38d. By this, adjustment of the initial pressure also becomes possible.

It is also possible to set the pressure control valve 90 to maintain the pressure Ps of the relief port A within a range where the pilot pressure Pp is lower than or equal to the predetermined pressure by adjusting the biasing force of the return spring 68 so that the valve body 63 is moved away from the seat surface $A_s$ for opening the relief port A at the initial condition.

INDUSTRIAL APPLICABILITY

As discussed above, since the present invention can freely modify the set pressure by modifying the pilot pressure, the pressure control valve can automatically control the fluid pressure in the pressure circuit in step-less manner.

Since the pressure control valve uses the fluid as the pilot signal, in comparison with the conventional proportioning electromagnetic type pressure control valve using the electrical signal as the pilot signal, satisfactory measure can be provided for safety, such as fire prevention or the like. Also, lowering of production cost can be achieved with simple construction.

By the invention defined in claim 2, the pressure control valve provided with the upper limit of the set pressure can be provided.

By the invention defined in claim 3, the pressure control valve provided with the lower limit of the set pressure can be provided.

Furthermore, by the invention defined in claims 4 and 5, the pressure control valve which can freely modify the set pressure within a wide range can be provided.

By the invention defined in claim 6, the pressure control valve which set the lower limit of the set pressure at 0, can be provided.

What is claimed is:

1. A pressure control valve including a valve body opposing to a seat surface of a relief port connected to a pressure circuit, a first spring biasing said valve body onto said seat surface, for flowing out a part of fluid within said pressure circuit to hold the fluid pressure in said pressure circuit at a predetermined set pressure when the fluid pressure in said pressure circuit is higher than or equal to the set pressure, a pilot piston arranged movably in expansion and contraction direction of said spring at an end portion of said spring remote from said valve body, said pilot piston moves in a direction for compressing said spring when a predetermined pressure of a pilot fluid is input, and a spring force of said spring is increased and decreased by varying compression force of said spring by moving said pilot piston depending upon increasing and decreasing of the pressure of said pilot fluid, and spring initial valve adjusting means having an initial valve adjusting spring modifying an initial spring force of said first spring by varying said pilot piston to a position proximal to said valve body and a position remote from said valve body when said pilot fluid is input, such that the initial spring force is increased when the predetermined pilot fluid pressure is increased and the initial spring force is decreased when the predetermined pilot fluid pressure is decreased.

2. A pressure control valve as set forth in claim 1, which further comprises a spring force upper limit setting means for holding large spring force of said spring constant by restricting movement of said pilot piston toward said valve body when a pressure of said pilot fluid is elevated up to a predetermined high value.

3. A pressure control valve as set forth in claim 1, comprising said spring being set a spring force resisting against a force for moving said pilot piston toward valve body side until the pressure of said pilot fluid is elevated to a predetermined value.

4. A pressure control valve including a valve body opposing to a seat surface of a relief port connected to a pressure circuit and a spring biasing said valve body onto said seat surface, for flowing out a part of said fluid within said pressure circuit to hold the fluid pressure in said pressure circuit at a predetermined set pressure when the fluid pressure in said pressure circuit is higher than or equal to the set pressure comprising a bias spring biasing the valve body for opening and closing the relief port to closing side, a pilot piston for biasing said biasing spring to closing side by a pressure of a pilot fluid, an initial valve adjusting spring for biasing the pilot piston to closing side, and a return spring for biasing the valve body or pilot piston to opening side.

* * * * *